Patented Dec. 7, 1948

2,455,413

UNITED STATES PATENT OFFICE 2,455,413

CALCIUM PHOSPHATE PHOSPHOR

Herman C. Froelich and Joseph M. Margolis, Cleveland Heights, Ohio, assignors to General Electric Company, a corporation of New York No Drawing. Application July 15, 1946, Serial No. 683,786

3 Claims. (Cl. 252—301.4)

Our invention relates generally to phosphors, that is, fluorescent or phosphorescent compositions. More particularly, the present invention is concerned with a phosphor consisting of calcium phosphate activated by trivalent cerium as disclosed in Patent 2,306,567 to W. A. Roberts, issued December 29, 1942. Such a phosphor emits long wave ultra-violet and a little deep blue light when excited by short wave ultra-violet, and is useful for such purposes as blueprinting and the excitation of other phosphors (particularly sulphides) when incorporated as a coating on the bulb or envelope of a low pressure mercury vapor discharge lamp serving as a source of exciting radiation of 2537 Å. wavelength.

According to our invention, we have discovered that the incorporation of a small amount of thorium as a secondary activator into the phosphor results in a substantial increase in brightness. The thorium is added to the raw batch in the form of any suitable compound, preferably the nitrate, although other suitable compounds such as the phosphate, hydroxide or sulphate may be used. It is fired or calcined together with the other batch ingredients. The amount is not critical, and fairly small percentages of $ThO_2$ produce results. If large amounts are used, the hydrolysis of the thorium nitrate will produce a strongly acidic solution. In this case we prefer to add the calculated amount of ammonia to the ammonium phosphate precipitant (used in the preparation of the phosphor) in order to arrive at about the same acidity after precipitation as we would without addition of thorium. Even without the addition of free ammonia brighter phosphors are obtained.

It is possible that the thorium, in whole or in part, forms a phosphate rather than an oxide in the finished product. However, regardless of the form in which it is present, it improves the output of the phosphor in an amount of the order of ten to fifteen per cent, the improvement being relatively stronger in phosphors fired at lower temperatures.

Although the oxides of aluminum, lanthanum, titanium, and zirconium were also tried, only thorium produced phosphors of improved brightness. Moreover, the addition of thorium to cerium-activated strontium and barium phosphates did not produce a substantial improvement in brightness. Nor was any substantial improvement obtained by adding thorium to thallium-activated calcium phosphate, or to calcium phosphate activated by both cerium and manganese.

The improvement in brightness resulting from the addition of thorium activator has been found to be due to a higher efficiency of energy conversion, and not to any substantial shift in either sensitivity of excitation or emission.

The phosphor may be prepared by any of the methods described in the Roberts patent hereinbefore referred to by incorporating a suitable thorium compound therein. However, the following is an example of a method of producing a phosphor containing .8% $ThO_2$ by weight: 400 grams $Ca(NO_3)_2 \cdot 4H_2O$, 60 grams $Ce(NO_3)_3 \cdot 6H_2O$ and 2.70 grams $Th(NO_3)_4 \cdot 4H_2O$ are dissolved in one liter of distilled water and brought to boiling. At the same time 244 grams $(NH_4)_2HPO_4$ are dissolved in one liter of boiling water and 1.3 ml. concentrated $NH_4OH(29\% NH_3)$ diluted with 25 ml. water is added thereto, and the mixture poured rapidly into the solution of the nitrates with constant stirring. The stirring is continued until the gelatinous mass first precipitated changes to a crystalline form. It is then filtered on a Buchner funnel and washed several times with boiling water. The precipitate is then dried at 200–300° C., crushed and screened. The material is then fired at 1250° C. in an atmosphere of hydrogen and steam for one hour, then cooled in a stream of hydrogen for one-half hour until at approximately room temperature. The phosphor is then crushed and screened.

As stated above, the amount of thorium which will produce the increased brightness is not critical. It may range from .01% or less to 20% or or more $ThO_2$, by weight. There is no material reduction in brightness with the larger amounts, but since no advantage is gained cost considerations dictate a preference for the smaller amounts.

As disclosed in the Roberts patent referred to above, the activator cerium may be present in a proportion of cerium to phosphate of from 1 to 20 per cent by weight, with a preferred range of about 4 to 15 per cent.

What we claim as new and desire to secure by Letters Patent of the United States is:

1. A fluorescent material consisting of calcium phosphate activated by both cerium and thorium, and characterized by the emission of long wavelength ultraviolet radiations when excited by ultra-violet radiation of 2537 Å. wavelength, the cerium being present in an amount of approximately 1–20 per cent by weight of the calcium phosphate and the thorium in an amount of approximately .01–20 per cent by weight of the calcium phosphate.

2. A fluorescent material consisting of calcium phosphate activated by both cerium and thorium, the cerium being present in an amount of approximately 4–15 per cent by weight of the calcium phosphate and the thorium in an amount of approximately .01 per cent to approximately 20 per cent by weight of the calcium phosphate, and characterized by the emission of long wavelength ultraviolet radiations when excited by ultraviolet radiation of 2537 Å. wavelength.

3. A fluorescent material consisting of calcium phosphate activated by about 4–15% cerium and about .8% thorium, each by weight of the calcium phosphate, and characterized by the emission of long wavelength ultraviolet radiations when excited by ultraviolet radiation of 2537 Å. wavelength.

HERMAN C. FROELICH.
JOSEPH M. MARGOLIS.

REFERENCES CITED

The following references are of record in the file of this patent:

UNITED STATES PATENTS

| Number | Name | Date |
| --- | --- | --- |
| 850,860 | Vanino | Apr. 16, 1907 |
| 2,049,765 | Fischer | Aug. 4, 1936 |
| 2,171,145 | Leverenz | Aug. 29, 1939 |
| 2,306,567 | Roberts | Dec. 29, 1942 |